(12) United States Patent
Tollefson

(10) Patent No.: US 7,926,314 B2
(45) Date of Patent: Apr. 19, 2011

(54) VEHICLE, SECUREMENT DEVICE AND SAFETY PORT

(75) Inventor: Dale Anton Tollefson, Brush Prairie, WA (US)

(73) Assignee: Peak Recreational Products, LLC, Brush Prairie, WA (US)

( * ) Notice: Subject to any disclaimer, the term of this patent is extended or adjusted under 35 U.S.C. 154(b) by 0 days.

(21) Appl. No.: 12/430,872

(22) Filed: Apr. 27, 2009

(65) Prior Publication Data
US 2009/0205380 A1 Aug. 20, 2009

Related U.S. Application Data

(63) Continuation of application No. 11/345,864, filed on Feb. 1, 2006, now Pat. No. 7,523,629, which is a continuation-in-part of application No. 11/020,964, filed on Dec. 22, 2004, now Pat. No. 7,428,833.

(51) Int. Cl.
*E05B 67/06* (2006.01)
(52) U.S. Cl. .................. 70/49; 70/14; 70/30; 70/233
(58) Field of Classification Search ............... 70/14, 18, 70/30, 49, 233
See application file for complete search history.

(56) References Cited

U.S. PATENT DOCUMENTS

| 3,605,458 | A | 9/1971 | Best |
|---|---|---|---|
| 3,670,535 | A | 6/1972 | Stettner et al. |
| 3,728,879 | A | 4/1973 | Best |
| 3,879,721 | A | 4/1975 | Yereance |
| 3,950,972 | A | 4/1976 | Bleier et al. |
| 4,044,577 | A | 8/1977 | Horlacher |
| 4,086,795 | A | 5/1978 | Foster et al. |
| 4,098,099 | A | 7/1978 | Smith |
| 4,665,724 | A | 5/1987 | Sakai |
| 4,693,098 | A | 9/1987 | Davis et al. |
| 4,760,719 | A | 8/1988 | Evans et al. |
| 4,845,967 | A | 7/1989 | Evans et al. |
| 4,896,517 | A | 1/1990 | Ling |
| 5,156,028 | A | 10/1992 | Jiang |
| 5,531,083 | A | 7/1996 | Franck, III et al. |
| 5,572,821 | A | 11/1996 | Coleman |
| 5,598,727 | A | 2/1997 | White |
| 5,669,571 | A | 9/1997 | Graybill |
| 5,768,920 | A | 6/1998 | DeBevoise |
| 5,786,759 | A | 7/1998 | Ling |
| 5,960,652 | A | 10/1999 | Marmstad |
| D460,341 | S | 7/2002 | Ling |
| 6,418,766 | B1 | 7/2002 | Luebeck |
| 6,581,420 | B1 | 6/2003 | Ling et al. |
| 6,588,638 | B1 | 7/2003 | Luebeck et al. |
| 6,619,980 | B1 | 9/2003 | Hsiao |
| 6,909,046 | B2 | 6/2005 | Laity et al. |
| 7,000,746 | B2 | 2/2006 | Mackin et al. |
| 7,108,544 | B2 | 9/2006 | Zoller |
| 2006/0131457 | A1 | 6/2006 | Nohren et al. |

FOREIGN PATENT DOCUMENTS

NL 8300-423 A 3/1984

*Primary Examiner* — Suzanne D Barrett
(74) *Attorney, Agent, or Firm* — Walter D. Fields; patenttm.us

(57) ABSTRACT

A personal property securement device mountable to a vehicle may comprise a cable housing with a safety port that defines a passage extending from internal to external the housing. A cable may be threaded through the passage with one end fixed to a cable retention knob external the housing and the other end fixed to a reel that may be disposed for rotation within the housing. A power spring may present a torque on the reel to enable retrievable winding and tensioned unwinding of the cable. The property securement device may further comprise a ratchet mechanism in cooperation with the reel to release tensioning of the cable at given incremental extractions.

24 Claims, 6 Drawing Sheets

VEHICLE, SECUREMENT DEVICE AND SAFETY PORT

REFERENCED TO RELATED APPLICATION

This application is a continuation of and claims benefit and priority to U.S. patent application Ser. No. 11/345,864, filed Feb. 1, 2006, entitled VEHICLE, SECUREMENT DEVICE AND SAFETY PORT, now U.S. Pat. No. 7,523,629, issued Apr. 28, 2009; which is a continuation-in-part of and claims benefit and priority to U.S. patent application Ser. No. 11/020,964, filed Dec. 22, 2004, entitled VEHICLE MOUNTABLE PERSONAL PROPERTY LOCK ASSEMBLY, now U.S. Pat. No. 7,428,833, issued Sep. 30, 2008; each of which is hereby incorporated by reference in its entirety.

BACKGROUND

The present disclosure relates to a property securement device with a retractable cable and, more particularly, to a vehicle mountable personal property securement device with a retractable cable and a safety port operable to control free rewind of such cable.

Cables and locks may be known for assisting securement of personal property. For example, some cable and lock solutions may be used to secure a bicycle, motorcycle, camping gear, etc., to a large, heavy, and/or immovable object. Some of these solutions may be understood to use a cable of given length, weight, and/or diameter dependent on its intended use. For example, a long and heavy cable may be used to assist, e.g., securement of a kayak to a large object such as a tree.

In some circumstances, however, when a long cable may be incorporated together into a given spring-driven or auto-rewind solution, certain risks, as recognized herein, may be presented to a user or person(s) staying nearby during some of the spring-driven retrievals.

SUMMARY

In accordance with an embodiment of the present invention, a personal property securement device may comprise a retractable cable housed within a housing that also includes a safety port for defining a passage of given diameter and length through a wall of the housing. The cable threaded through the safety port may comprise a cross-sectional diameter of magnitude less than that of the passage. A reel within the housing may be operable under the influence of a power spring to apply a force upon the cable for enabling tensioned winding and unwinding of the cable.

In a further embodiment, the safety port may be found integral with the housing and, in accordance with an alternative embodiment, may comprise a bushing disposed within an opening through a wall of the housing. In a particular case, the diameter of the passage may be sufficiently great to permit substantially free passage of the cable when it is presented thereto with an alignment that is less than about five degrees relative to a central axis of the passage.

In yet a further embodiment, an edge to an annual opening at an entry/exit of the passage may comprise a radius of curvature operable for enabling a given coefficient of friction relative to a surface of the cable. In addition, the length of the passage and the diameter of the passage relative to the cable may be operable in combination with the coefficient of friction associated therewith for enabling formation of resistive forces upon the cable. Further, these parameters may be designed so that the available resistive forces may be greater than a take-up or winding force of the power spring when a given length of the cable is released external the housing during a rewind process.

BRIEF DESCRIPTION OF THE DRAWINGS

The subject matter of embodiments of the present invention may be understood by reference to the following detailed description and with reference to the accompanying drawings, in which:

FIG. 2C is an enlarger view of a cable retention knob.

DETAILED DESCRIPTION

Figure 1:
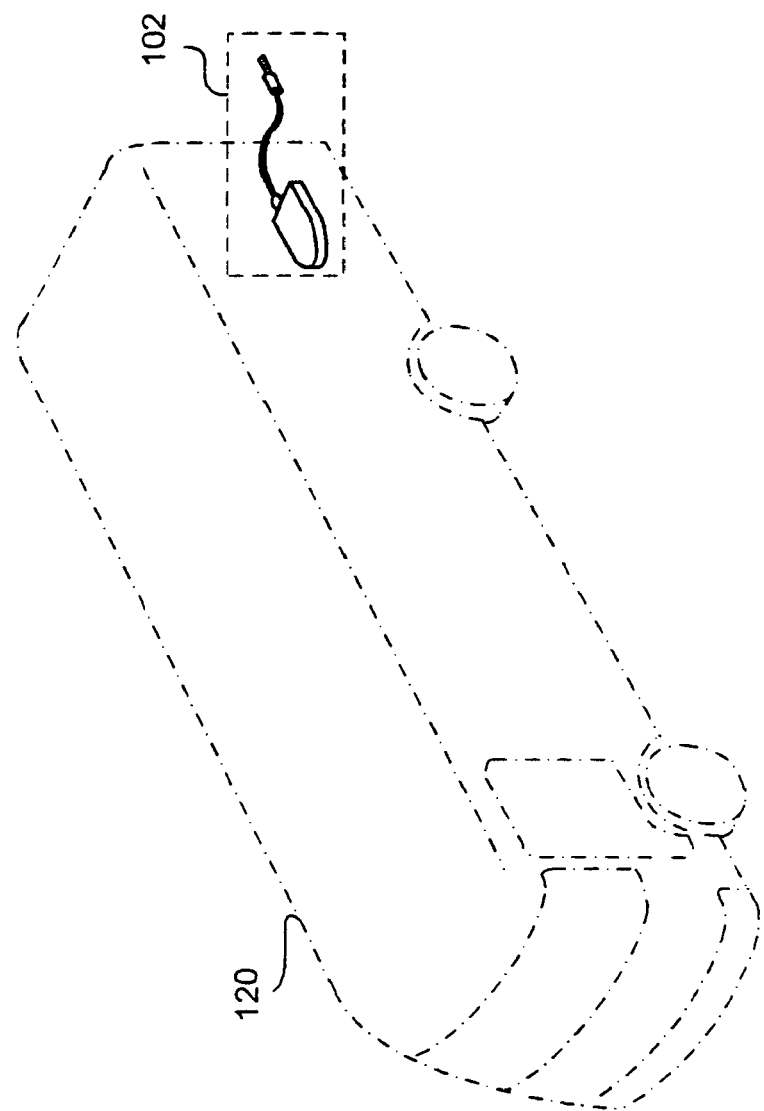
FIG. 1 is a simplified perspective view of a vehicle with a property securement device mountable to the vehicle, consistent with some embodiments of the invention.

While the invention is amenable to various modifications and alternative forms, specifics of particular embodiments are presented by way of example in the drawings. It should be understood, however, that the intention is not necessarily to limit the invention to the particular embodiments described. On the contrary, the intention is to cover all modifications, equivalents, and alternatives falling within the spirit and scope of the invention as defined by the appended claims.

In the description that follows, readily established structures for the exemplary embodiments may be disclosed in simplified form (e.g., simplified housing, safety port, ratchet mechanism, and/or simplified description) to avoid obscuring an understanding of the embodiments with excess detail and where persons of ordinary skill in this art can readily understand their structure by way of the drawings and disclosure. Likewise, identical components may be given the same reference numerals, regardless of whether they are shown in different embodiments of the invention. Further, it may be understood that the illustrated embodiments may not necessarily be drawn to scale.

The term "vehicle" as used herein may refer, depending upon context, to various types of vehicles including, without limitation, recreational vehicles, trucks, travel trailers, fifth-wheel trailers, utility trailers, tractors, toy haulers, etc.

In a given application and consistent with one embodiment of the present invention, referencing FIG. 1, a property securement device 102 may be anchored by way of welding or by other couplers or fastening means to a vehicle for use in securing one or more personal property items (not shown) within a given environment such as an outdoor camp ground.

In one embodiment, the housing to the property securement device may provide the coupling interface that is mountable to a portion of the vehicle, for example, a trailer chassis, a frame member, a hitch, etc. A length of the cable may be retractably stored about a reel inside the housing, while another portion that is pulled from the housing may be available for routing through or about certain personal property. A fixture fastened to an end of the cable may enable the cable to be locked operatively upon itself or to a locking member or a latch mechanism of the assembly.

Figure 2A:
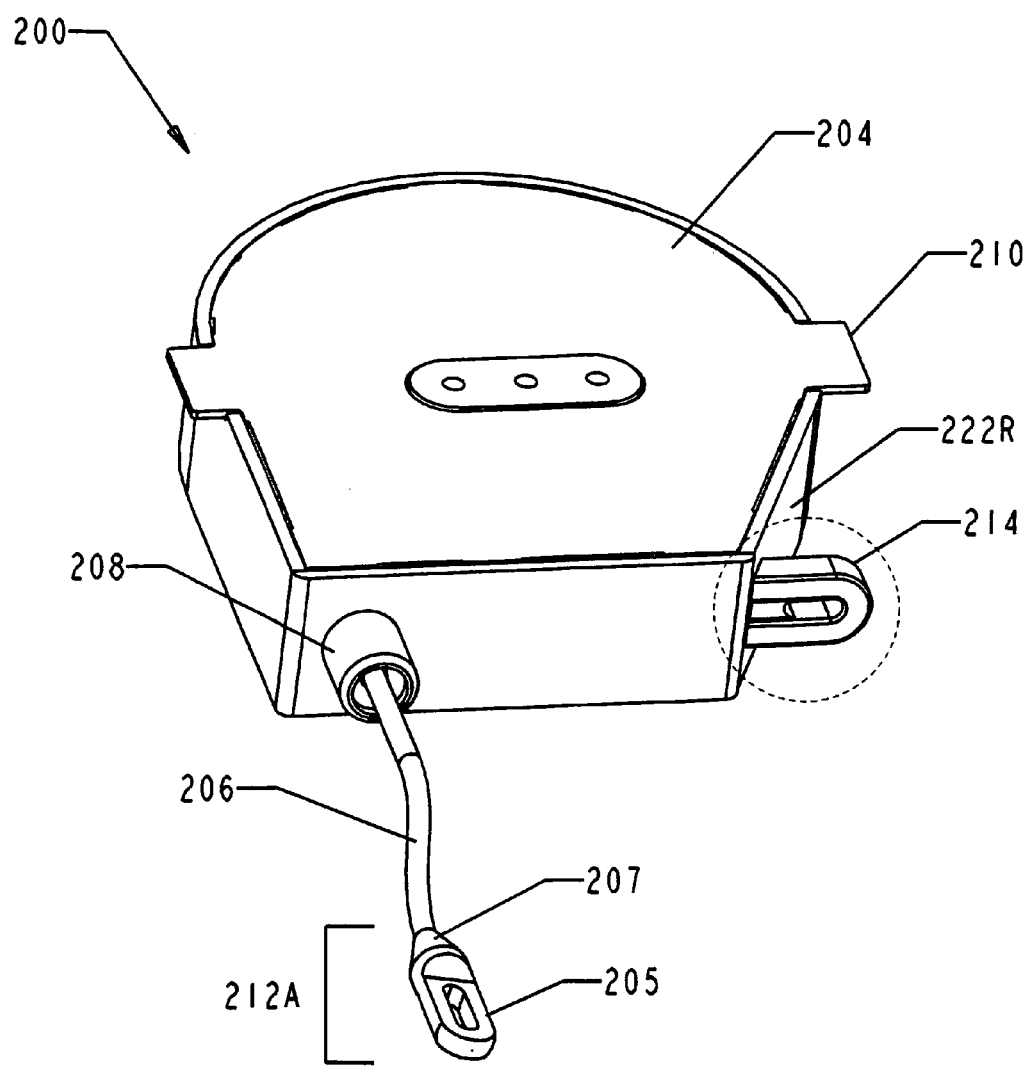
FIGS. 2A, 2B are simplified perspective and assembly views of a property securement device, consistent with some embodiments of the invention, showing a safety port through which a cable is threaded.
Figure 2B:
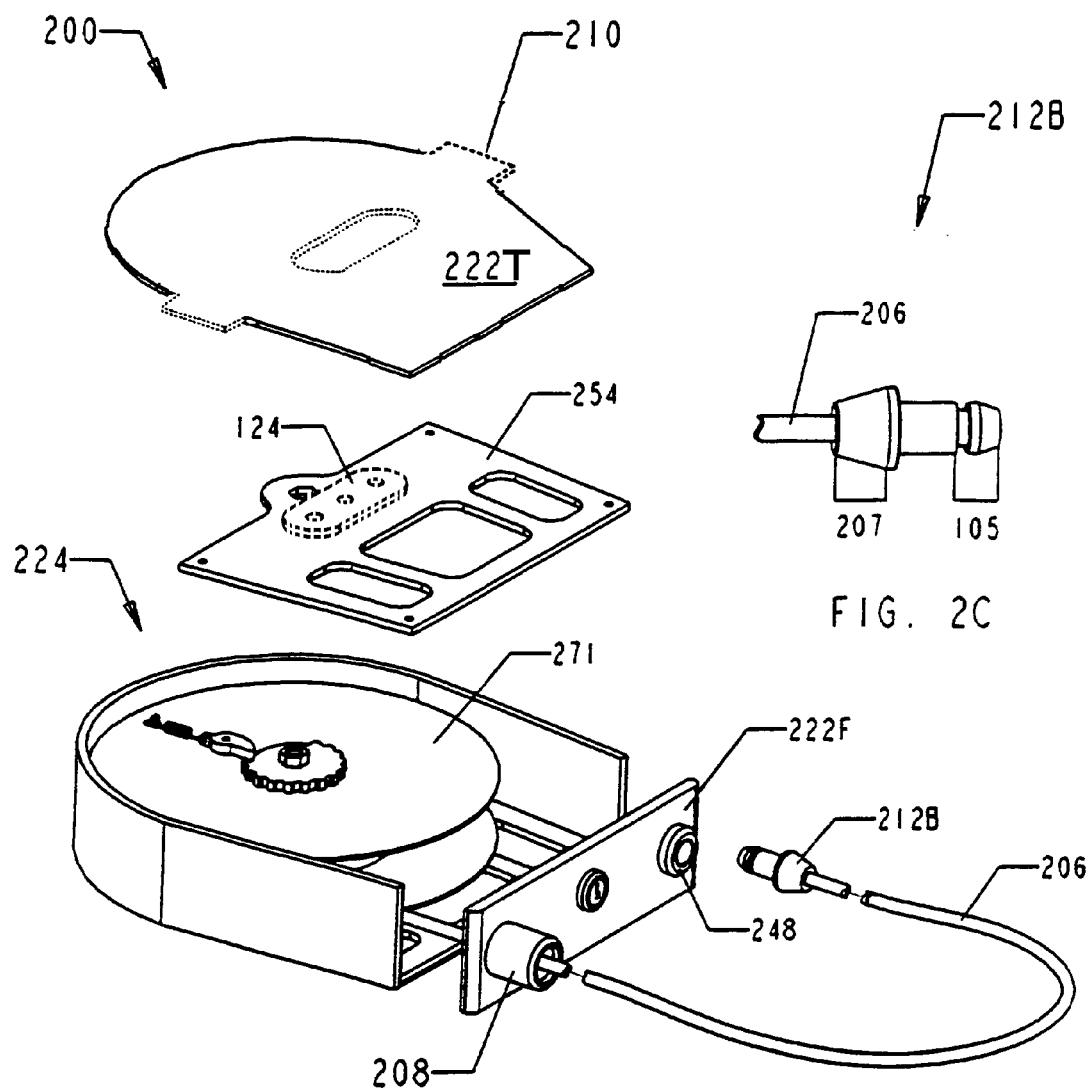

In one embodiment, referencing FIGS. 2A and 2B, property securement device 200 may comprise housing 204 defined by walls 222. Inside surfaces of the walls may be understood to define an interior chamber 224. A cable reel 271 may be attached to at least one of the walls 222 and operable to retractably store a length of cable 206. One end of cable 206 may be anchored to the reel, while the other end may be extended outside housing 204 through safety port 208. The safety port 208 defines a passage of predetermined length and diameter through a wall of the housing. In one embodiment of the invention, a bushing 208 may be disposed into an opening of a wall 222F for defining the passage. In another embodiment, the housing and the safety port may be defined by a single cast or welded structure solution. In further embodiments, the safety port 208 may be defined by a separable device (e.g., a bushing) that is removably fixed to a wall of the housing. It may be understood that the bushing might be described alternatively as a type of grommet (for the passage diameter and length, and of composition disclosed herein) fixed within such opening of the wall.

Further referencing FIGS. 2A and 2B, property securement device 200 may comprise a coupler provision 124 (in phantom) or mounting mechanism such as wings 210 operable as a welding plate to assist mounting of housing 204 to a chassis or frame member of vehicle 120 (FIG. 1). For example, wings 210 may be defined to extend outwardly from the housing as a part and lateral extension of top wall 222T. Wings 210 may provide an interface operable to assist fixing (e.g., welding) of the property securement device 200 to vehicle 120. In this particular embodiment, wings 210 may extend outwardly on each side of housing 204 by a few inches. Wings 210 and housing 204 may be formed (e.g., cast or welded) together as a single unitary structure. In another embodiment, a wing plate may be removably fixed or assembled, e.g., as part of an internal assembly plate 254, or as a partial frame member within the housing, for enabling provision of mounting mechanism.

Further referencing FIG. 2B, in a further embodiment, the property securement device 200 may comprise latch receiving mechanism 248 operable to capture and secure a cable retention knob 212B that may be fixed to the end of cable 206. In operation, after the cable is passed through or around various personal property items, the cable retention knob may then be inserted into the latch receiving mechanism for locked capture. The latch receiving mechanism of such embodiment may be understood to be operable collectively, e.g., with a keyed locking mechanism, to secure the grooved end of the cable retention knob when it is inserted therein. Further description of such keyed locking mechanism may be found in U.S. patent application Ser. No. 11/020,964, filed on Dec. 22, 2004, and owned in common by the assignee of the present application and hereby incorporated by reference in its entirety.

In another embodiment, referencing FIG. 2A, a receiving mechanism may comprise a u-shaped bar 214 integrated with the exterior of housing sidewall 222R. The u-bar 214 and housing sidewall 222R may be made as a single unitary structure, e.g., during the casting or molding process for manufacture of housing 204. Alternatively, u-bar 214 may be mounted onto housing sidewall 222R by at least one of the typical mounting methods such as welding and bolting. While referenced herein as a u-bar, other embodiments may utilize an alternative aperture or outline-shape operable to receive the passable portion of the knob/head/locking/mating-element.

As a cable receiving mechanism, u-bar 214 may be shaped and positioned to enable passage of a tab portion of a particular form of cable retention knob 212A. For example, the tab portion may be understood to comprise a flat extension that may extend longitudinally as a locking end from a butt-end 207 of the cable retention knob. Further referencing FIG. 2A, the tab portion of locking end 205 may comprise an appropriate width and circumference to allow free pass through the inner opening defined by u-bar 214 and the exterior surface of the housing sidewall 222R. In a particular embodiment, locking end 205 may be locked to u-bar 214, once extended therethrough, by a padlock (not shown). An arm of a known padlock may fit through a slot of the tab after it has been inserted through the u-bar.

In a further embodiment, the tab section may define, e.g., a slot of a width that is at least as great as a diameter of the cable and length that is at least two times as great as the diameter of the cable. A padlock (not shown) may then pass around the cable and be inserted through the slot.

Figure 3:
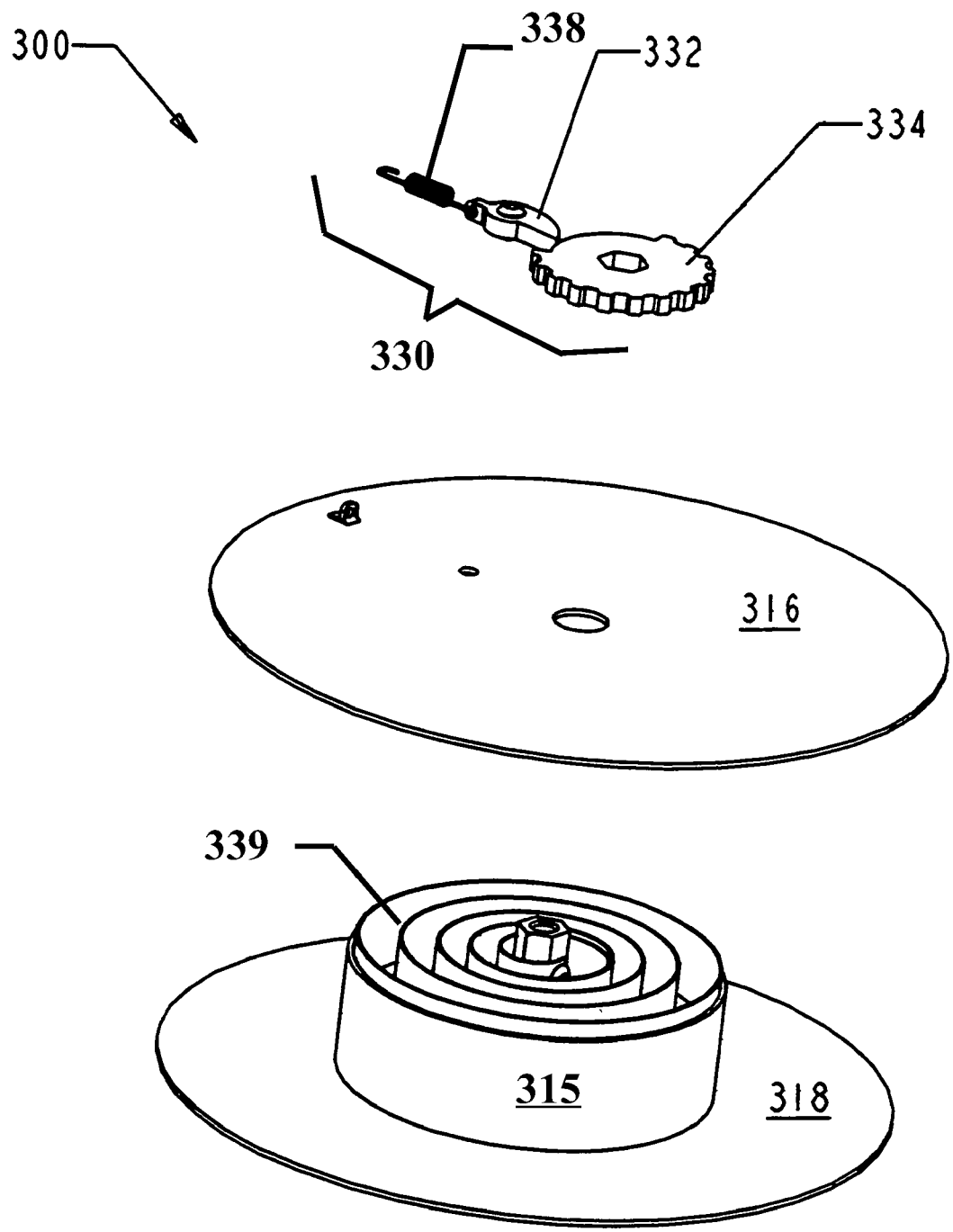
FIG. 3 is a perspective and assembly view of a cable reel that may be disposed within the housing, consistent with some embodiments of the present invention, showing cable attachment to the reel and also an inner power spring and a ratchet mechanism for the reel.

Continuing with reference to FIGS. 2B and 3, in some embodiments of the invention, housing 204 may house reel assembly 300 that is operable to retractably secure and/or store cable 206. The reel may be attached or disposed (e.g., axially) to at least one of the walls or between two opposing walls. By rotation in one direction, it may be operable to forcedly retrieve the cable for storage, and by rotation in an opposite direction, it may allow retractable extension of given lengths of cable 206 under tension.

Referencing FIG. 3, in further embodiments, upper plate member 316 may comprise a ratchet mechanism 330 operable to release tension on the cable at user-controlled lengths of cable 206 as it is pulled from the housing. Ratcheting lever 332, biased by spring 338, may engage each notch that is positioned about the circumference of ratchet wheel 334 as the cable is pulled outwardly beyond the notches associated with the incremental extractions. That is, the lever may be biased to enable capture of the reel at each notch so that it may prevent rewind of the cable if it should be released at the associated angular placements about the ratchet wheel. But at certain larger increments, the ratchet lever (or clip) may slide into a neutral zone of the wheel circumference. In these neutral zones, the ratchet lever (or clip) may find free clearance for enabling release of the reel. Accordingly, reversals of reel direction may be allowed. When the rotation direction reverses for rewind, a power spring within reel mechanism 300 may then act to drive retrieval of the cable from external the housing. Further referencing FIG. 3, it may be understood that ratchet lever 332 and biasing spring 338 may be realized in other forms as a component of ratchet mechanism 330, while remaining collectively operable therewith to assist the incremental retractable cable extension.

Although reel assembly 300 may take many forms, in a particular embodiment with reference to FIG. 3, it may comprise upper plate member 316 and lower plate member 318 defining, e.g., circular plates, substantially parallel to each other. The upper and lower plate members may be intercoupled by core 315. The power spring/clock-type spring 339 may be disposed within core 315 and operable to apply a bias between a center axis and the reel to allow tensioned rewind and/or tensioned unwinding of the cable onto/from the circumference of the inner core.

In accordance with certain embodiments of the invention, referencing FIGS. 2A through 3B, safety port 208 may be integrated with the housing to define a passage through a wall of the housing for threading cable 206. In such embodiments, safety port 208 may be integral to housing 204 and might be formed by casting or welding, while in other embodiments, it may comprise a bushing fixed to an opening in a wall 222F of the housing. In operation, the passage may be designed to prevent accelerated whipping of the cable under the influence of the power spring—in the event a given length of the cable is suddenly freed during a rewind process.

Figure 4A:
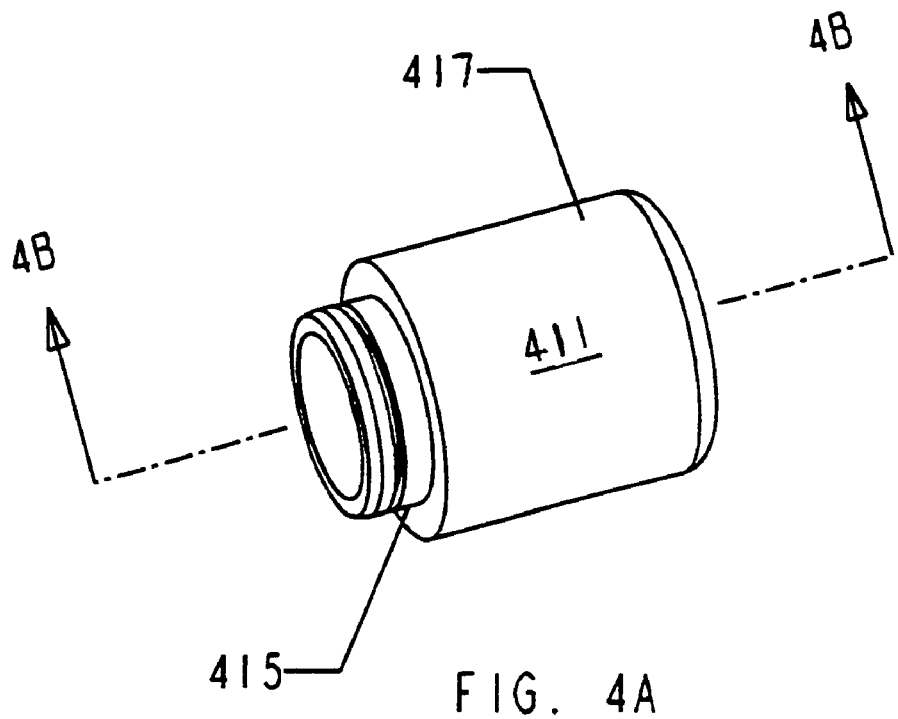
FIGS. 4A, 4B are simplified perspective and cross-sectional views of a safety port, in accordance with an embodiment of the invention, showing an inner surface defining a passage.
Figure 4B:
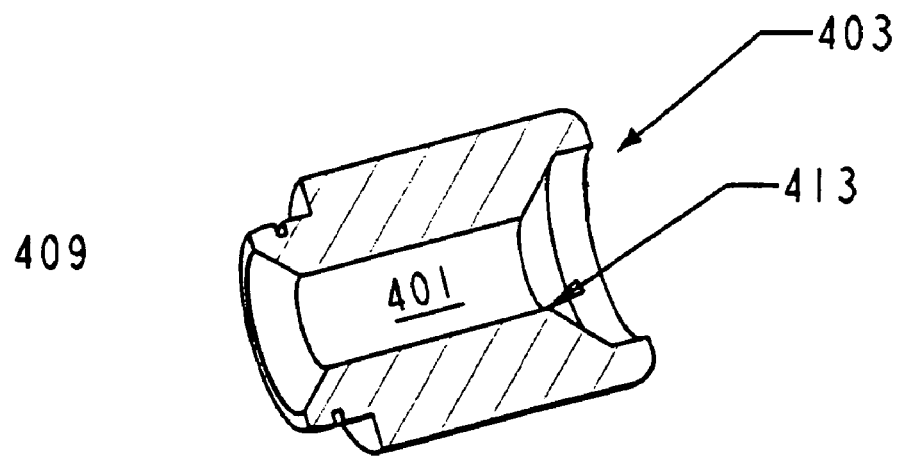

In a particular embodiment, referencing FIGS. 4A and 4B, safety port 208 may be formed by bushing 411 fitted into an opening of housing wall 222F. The bushing 411 may be formed with an inner cylindrical surface that defines passage 401 with a given diameter and length. The diameter of passage 401 may be sufficiently great to permit substantially free passage for cable 206 when it is presented in substantially parallel axial relationship to the central axis of the passage. In a particular embodiment, for example, passage 401 may comprise a diameter of about seven-sixteenths inches ($7/16$ inches) and cable 206 a diameter of about three eighths inches ($3/8^{th}$ inches). The length of the passage may be based on such diameters so as to permit substantially free passage of the cable when it is presented thereto with an alignment to its central axis of magnitude less than, e.g., about ±5 degrees. For the example above, the length would be about one inch for the case of a cable-to-passage clearance gap of one-sixteenth inch ($1/16^{th}$ inch).

Further referencing FIGS. 3A and 3B, the peripheral edges for the entry/exit openings that lead to the passage may be formed in the bushing with a particular sharpness. In other words, the inwardly facing cylindrical surfaces that define the passage through the bushing will meet the countersunk recessed surface at an exit and/or entry 403 to define what may be described as a peripheral edge 413. The edge may be characterized with a given sharpness or radius of curvature. The material of the bushing that forms edge 413, further referencing the cross-sectional view of FIG. 4B, and the sharpness of the edge may be operable in combination with the outer surface and/or sheath material of the cable to define a given coefficient of friction therebetween. Thus, in a particular example, the material and the sharpness for edge 413 may be designed and selected in combination with the composition of the cable's outer surface for enabling a given resistive force on the cable when a given length should be released external the housing. When released, the cable may be understood to rest (for example, under its own free-weight) and/or to be pressed against the edge(s) at the entry/exit opening(s) to the passage.

In a particular example, at least one parameter from the group consisting of the sharpness and material composition for edge 413, the composition for the outer surface of cable 206, the length and the diameter for passage 401, and the diameter of the cable may be selected in combination with the others for enabling possible formation of such resistive force with a magnitude that may be greater than a take-up force that might otherwise act on the cable as delivered thereto by the power spring for a given length external the housing. Such take-up force may be understood to be present during a cable retrieve or re-wind process. In accordance with one embodiment, therefore, at least one of the parameters above may be selected for enabling availability for such resistive force of a magnitude greater than the collective weight of, e.g., at least three feet of the cable.

In further embodiments and by an alternative perspective, the power-spring may be understood to be selected and/or designed with a spring-constant that may be operable per a given radial dimension of the take-up reel to apply tension to the cable of a magnitude related to said predetermined length of the cable. For example, it may comprise a spring-constant for predetermined torque designed to be operable in combination with the radius of the take-up cable reel for applying tension on the cable of magnitude less than the magnitude of the collective weight of the predetermined length of the cable external the housing.

Figure 6:
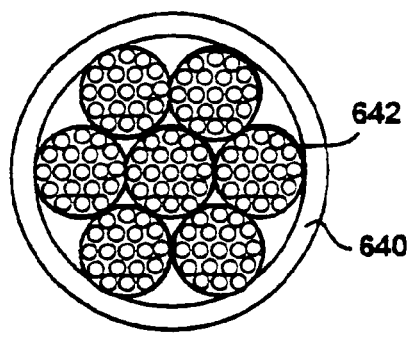
FIG. 6 is a simplified cross-sectional view of the cable showing multi-stranded metal bundled together within a PVC coating.

In one example for such embodiment, referencing FIG. 6, cable 206 of the property securement device may comprise Polyvinylchloride (PVC) coated multi-strand steel wires (FIG. 6) of diameter of about $3/8^{th}$ inch. The passage in the bushing may be formed with a length of up to about 1 inch and a diameter of about $7/16^{th}$ inches (e.g., for a passage-to-cable clearance of about $1/16^{th}$ inch), and the bushing may comprise a composition of, e.g., an aluminum alloy, operable to define a given coefficient of friction relative to the cable coating. While comprising an aluminum alloy for this embodiment, alternative embodiments may comprise alternate compositions of metals or plastics operable for establishing a coefficient of friction relative to the cable.

Assuming an aluminum alloy for the bushing in one embodiment, the peripheral edge at the entry/exit to the passage may be defined with a radius of curvature of at least 15 mils (0.015 inches) or $1/64^{th}$ inch—i.e., as may be available from a typical de-burring or broken-edge process. Further, such PVC coating to the cable may be characterized with a degree of hardness sufficient to withstand repeated wear against the edge and material of the bushing. The power spring may be designed for delivering, via the reel, a tension to the cable of a magnitude less than the weight of at least three feet of the cable external the housing. For such embodiment, therefore, the cable may pass substantially freely through the passage during a retrieval process when presented thereto with an angle of presentment of less than about ±5 degrees relative to a central axis through the passage.

In alternative perspective, therefore, if the cable external the housing is released during retrieval, the cable may sag under its own free weight for contacting the leading edge at the entry/exit of the passage. It might also be described as providing an angle of presentment to the bushing of a magnitude greater than five degrees from the central axis of the passage. Additionally, the weight of the cable external the housing may be understood to rest substantially on the leading edge of the passage for imparting a resistive force to the cable that will be related to both the weight of the cable and the coefficient of friction between the bushing and the coating of the cable.

Above, operation of the property securement device 102, in accordance with an embodiment of the invention, has been described simplistically relative to the resistive force that may be presented by the "leading" edge at the entry/exit opening to the passage of the bushing per the weight of a predetermined length of the cable external the housing. It may be understood, however, that additional influences may impart further resistive contributions. For example, assuming a substantial stiffness for the cable over the relatively small length (e.g., one inch) of the passage, it may be understood that the weight of the cable external the housing may cause an upper surface of the cable to be pressed—i.e., in a cantilevered fashion as a part of a coupled counter-force—against the peripheral edge of the inward opening to the passage (i.e., the inward opening being presented internal the housing and opposite to the outer opening that is presented external the housing).

The magnitude of the cantilevered force presented from the edge of the inward opening to the top of the cable may be understood to be related directly to the weight of the cable external the housing and inversely to the length of the passage (the effective length for the arm of the cantilever). This cantilevered force may be referenced alternatively as the coupled-force—i.e., that which will also be coupled to the forward or leading edge of the passage. By such simplistic analysis, therefore, it may be understood that the resistive force available may be greater than solely the weight of the length of the cable external the housing. In fact, the additional cantilevered force presented, via the cantilevering effect, may be understood to be multiple times the resistive force per that of the cable weight alone. Thus, for certain further embodiments, the power spring may be designed for delivering (via the radial dimension of the reel) a tension to the cable of a magnitude of multiple times, (e.g., at least three to four times) the weight of the predetermined length (e.g., three feet) of cable. Therefore, assuming a multi-strand metal cable comprising PVC coated diameter of $3/8^{th}$ inch and length of about 18 feet in combination with a passage defined by a bushing of about a one inch length and $7/16^{th}$ inch diameter, the power-spring may be selected for delivering around 30 inch-lbs. torque to the reel at about 5800 degrees of reel rotation.

Returning with reference to FIGS. 1 and 2A, in accordance with some embodiments, the property securement device 102 may be fixed to a chassis or frame member of a vehicle 120. The elevation of the safety port 208 relative to a ground level is designed sufficiently great to allow at least three feet of cable 206 to sag (dependent upon cable stiffness and the cable's clearance within the passage) before it might otherwise contact the ground, which would be understood to support its weight for relief of the associated cantilevered or coupled forces. Accordingly, per a given embodiment and further referencing FIGS. 1 and 2A, the housing 204 for the personal property securement device 102 may be mounted on the vehicle for positioning the safety port 208 at an elevation of, e.g., at least ten inches above the ground level.

In further embodiments, continuing with reference to FIGS. 4A and 4B, the external cylindrical surface 417 to bushing 411 may be machined to form a neck member 415 that is operable to assist fastening the bushing to, e.g., front wall 222F of housing 204. The chamfer may define a shoulder that may stop against the outer surface of the wall outside the circumference of the opening therethrough. The neck member 415 may be described as continuous with a mid-section, e.g., cylindrical shaft 417. When assembled or integrated together with the housing, it may protrude externally from the front wall 222F. The joint defined between the neck member and the extension member may further be understood to include known provisions to assist fastening of the bushing to the wall 222F.

In this embodiment of FIGS. 4A, 4B, cylindrical mid-section 417 may protrude, for example, about 1.5 inches outwardly from the front wall 222F of housing 204. The bushing may further be formed with a tapered opening at an exit of passage 401. The tapered opening may define a curvature shaped to seat, with non-binding engagement, the butt-end 207 of cable retention knob 212. In an alternative embodiment, the majority of the longitudinal length of bushing 317 may protrude internally while only a small portion of the bushing may protrude outwardly from the housing.

Figure 5:
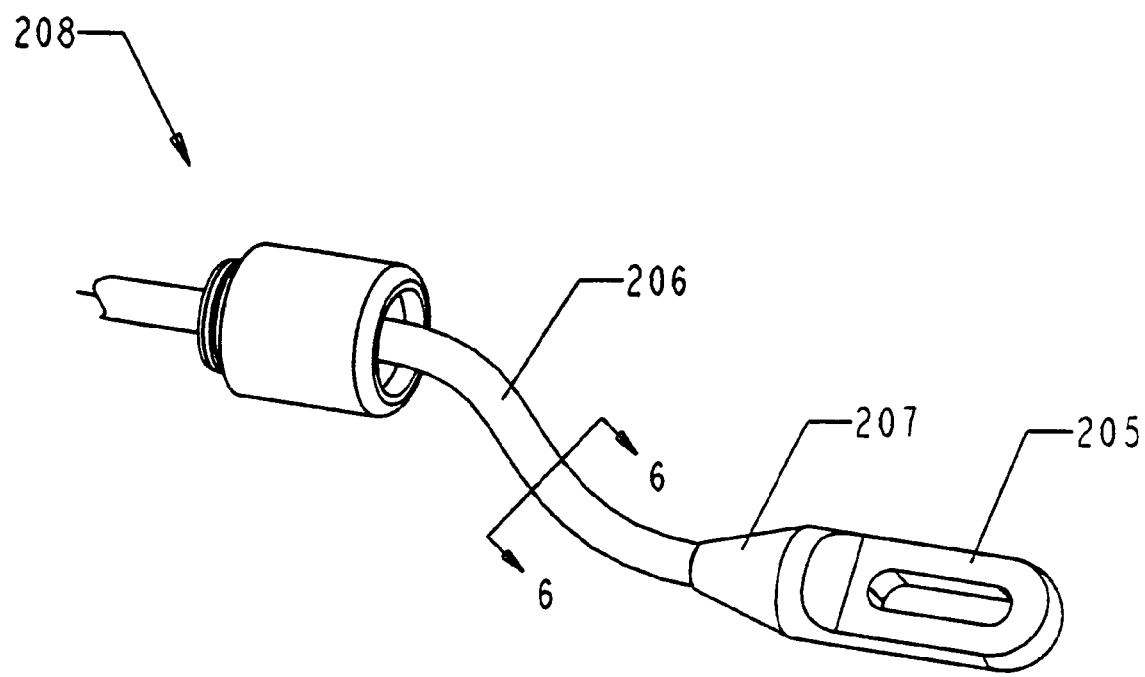
FIG. 5 is a simplified perspective view of a cable threaded through the safety port of FIG. 4A in accordance with an embodiment of the present invention, and further showing one end of the cable fixed to a cable retention knob.

Referencing FIGS. 2B and 5, cable 206 may be threaded through passage 401 of bushing 411 as defined by safety port 208. While one end of cable 206 may be coupled to the reel within the housing, the other end of the cable may be coupled to the cable retention knob 212 (e.g., tip, knob, phallic head, securing pin, locking head, keyed plug, etc.) outside housing 204. In accordance with one embodiment, butt-end 207 of cable retention knob 212 may be shaped for non-binding, seated engagement within the countersunk recess or tapered opening at the passage entry. The mating head 212 may be shaped for insertion or latching engagement within a cable receiving mechanism. For example, mating head 212 may thus be shaped for plug insertion and capture within a receiving port of the cable receiving mechanism that is integrated into front wall 222F.

Further referencing FIG. 4, butt-end 207 of cable retention knob 212 may flare outwardly from the cable diameter toward the radius of a cylindrical shoulder thereof, wherein the flare-out may be angled (e.g., 45 degrees) to fit the contoured surface for a tapered opening of the bushing. That is, when cable 206 is fully retracted for storage within the inner chamber of housing 204, the shoulder defined by the butt-end of the cable retention knob may be held (under the influence of the torque presented on the reel by the power spring) against the countersunk surface of the tapered opening 403.

Further referencing FIG. 6, cable 206 may comprise a known multiple-stranded metal structure 642. In a particular embodiment, cable 206 may comprise, e.g., seven strands of 19 metal wires bundled together. A sleeve 640 of PVC material may collectively sheath the seven braids. A specific coefficient of friction may be defined by the PVC coating 640 relative to the edges of passage 401. Additionally, such cable for one embodiment may comprise a weight per unit length of, for example, about 0.038 lbs/in. such that three feet of cable could weight up to about 1.5 lbs.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention as may be set forth in the following claims.

What is claimed is:

1. A property securement device, comprising:
  a housing;
  a safety port defining a passage of given diameter and length extending from internal to external the housing;
  a cable threaded through the safety port comprising a cross-sectional diameter less than the diameter of the passage;
  a cable retention knob fixed to a first end of the cable;
  a reel within the housing, the second end of the cable secured to the reel and the reel operable to wind a length of the cable for storage; and
  a power spring to apply a rotational force on the reel to enable tensioned winding and unwinding of the cable;
  the safety port of the given diameter and length for the passage operatively configured to be operable upon and cooperatively with the cable to apply a frictional braking force and slow retraction of the cable when at least a given length thereof is external the housing and freed while under the influence of the power spring for tensioned rewind, further comprising a ratchet mechanism operable in cooperation with the reel to release tensioning of the cable at given incremental extractions of the cable from the housing;

the ratchet mechanism further operable in cooperation with the reel to define neutral zones along substantially periodic intervals of the cable extension, wherein a periodic interval of the periodic intervals is defined by multiple of said given incremental extractions, the ratchet mechanism further operable collectively with the wheel when within a given neutral zone of the neutral zones to enable freeing of the reel for permitting reversal of reel rotation and restored tension for cable retraction under the influence of the power spring; and in which the housing is operatively configured to be mountable to a vehicle.

2. The device of claim 1, in which at least one wall of the housing defines an opening, and said device further comprises a bushing disposed within the opening to define the passage.

3. The device of claim 2, in which the diameter of the passage defined through the bushing is (i) sufficiently great to permit substantially free passage of the cable when the cable is presented to the passage with an angular alignment relative to a central axis of the passage of magnitude less than about five degrees, and (ii) sufficiently small to cause the cable to press against at least one of the walls that define the passage when the cable is presented thereto with an angular alignment relative the central axis of magnitude greater than about five degrees.

4. The device of claim 3, in which the cable comprises an outer surface;

the bushing for the safety port per a cross-sectional view along a length of the passage defines an edge at an annular opening thereto, the edge comprising a given radius of curvature operable with the outer surface of the cable to define a coefficient of friction therebetween; and at least one of the parameters of the group consisting of: a clearance of the passage relative to the cable, the length of the passage, and the coefficient of friction between the bushing and the outer surface of the cable, comprises magnitude(s) sufficient to enable formation of a resistive force on the cable greater than a take-up or winding force deliverable to the cable by the power spring when a given length of the cable is released external the housing during rewind.

5. The device of claim 4, in which the radius of curvature to the edge is formed by an edge de-burring treatment.

6. The device of claim 4, in which the cable comprises a coating of polymer material;

at least a portion of the bushing that defines the edge comprises one material of the group of materials consisting of metal and plastic; and the coefficient of friction is defined between the polymer material coating of the cable relative to said one material defining the edge of the bushing.

7. The device of claim 6, in which the cable further comprises a multi-stranded metal structure bundled within a PVC sleeve as the coating of polymer material.

8. The device of claim 7, in which the given length of the cable external the housing is predetermined based on a weight thereof operable in combination with the coefficient of friction to establish the resistive force greater than the take-up force deliverable to the cable by the power spring during rewind.

9. The device of claim 8, in which the given length for the cable to establish the weight is at least about three feet, and the cable further comprises a total length greater than about six feet.

10. The device of claim 3, in which the cable retention knob comprises:

a locking end operable collectively with a lock mechanism for enabling securement;

a cylindrical portion in contiguous relationship with the locking end and defining a mid-section thereto; and a butt-end joined to the cable and in contiguous relationship with the cylindrical portion, the butt-end defining an angular flare-out shoulder between its junction with the cable and the cylindrical portion and operable to seat with non-binding engagement within a tapered opening of the bushing proximate an entry/exit to the passage.

11. The device of claim 10, in which the locking end defines an elongated tab that extends axially from the cylindrical portion and defines an elongated slot of width sufficient to receive either a fold of the cable or a shaft of a padlock.

12. The device of claim 11, in which the power spring is assembled in the reel with a pre-bias sufficiently great to present a torque on the reel to forcibly seat the butt-end of the cable retention knob against a countersunk recess of the bushing that defines the taper when the cable is fully retrieved.

13. A property securement device, comprising:

a housing;

a safety port defining a passage of given diameter and length extending from internal to external the housing;

a cable threaded through the safety port comprising a cross-sectional diameter less than the diameter of the passage;

a cable retention knob fixed to a first end of the cable;

a reel within the housing, the second end of the cable secured to the reel and the reel operable to wind a length of the cable for storage; and a power spring to apply a rotational force on the reel to enable tensioned winding and unwinding of the cable;

the safety port of the given diameter and length for the passage operatively configured to be operable upon and cooperatively with the cable to apply a frictional braking force and slow retraction of the cable when at least a given length thereof is external the housing and freed while under the influence of the power spring for tensioned rewind, further comprising a ratchet mechanism operable in cooperation with the reel to release tensioning of the cable at given incremental extractions of the cable from the housing;

wherein the ratchet mechanism is further operable in cooperation with the reel to define neutral zones along substantially periodic intervals of the cable extension, wherein a periodic interval of the periodic intervals is defined by multiple of said given incremental extractions, the ratchet mechanism further operable collectively with the wheel when within a given neutral zone of the neutral zones to enable freeing of the reel for permitting reversal of reel rotation and restored tension for cable retraction under the influence of the power spring; and wherein the safety port is integral with the housing.

14. The device of claim 13, in which at least one wall of the housing defines an opening, and said device further comprises a bushing disposed within the opening to define the passage.

15. The device of claim 14, in which the diameter of the passage defined through the bushing is (i) sufficiently great to permit substantially free passage of the cable when the cable is presented to the passage with an angular alignment relative to a central axis of the passage of magnitude less than about five degrees, and (ii) sufficiently small to cause the cable to press against at least one of the walls that define the passage when the cable is presented thereto with an angular alignment relative the central axis of magnitude greater than about five degrees.

16. The device of claim 15, in which the cable comprises an outer surface;

the bushing for the safety port per a cross-sectional view along a length of the passage defines an edge at an annular opening thereto, the edge comprising a given radius of curvature operable with the outer surface of the cable to define a coefficient of friction therebetween; and at least one of the parameters of the group consisting of: a clearance of the passage relative to the cable, the length of the passage, and the coefficient of friction between the bushing and the outer surface of the cable, comprises magnitude(s) sufficient to enable formation of a resistive force on the cable greater than a take-up or winding force deliverable to the cable by the power spring when a given length of the cable is released external the housing during rewind.

17. The device of claim 16, in which the radius of curvature to the edge is formed by an edge de-burring treatment.

18. The device of claim 16, in which the cable comprises a coating of polymer material;

at least a portion of the bushing that defines the edge comprises one material of the group of materials consisting of metal and plastic; and the coefficient of friction is defined between the polymer material coating of the cable relative to said one material defining the edge of the bushing.

19. The device of claim 18, in which the cable further comprises a multi-stranded metal structure bundled within a PVC sleeve as the coating of polymer material.

20. The device of claim 19, in which the given length of the cable external the housing is predetermined based on a weight thereof operable in combination with the coefficient of friction to establish the resistive force greater than the take-up force deliverable to the cable by the power spring during rewind.

21. The device of claim 20, in which the given length for the cable to establish the weight is at least about three feet, and the cable further comprises a total length greater than about six feet.

22. The device of claim 15, in which the cable retention knob comprises:

a locking end operable collectively with a lock mechanism for enabling securement;

a cylindrical portion in contiguous relationship with the locking end and defining a mid-section thereto; and a butt-end joined to the cable and in contiguous relationship with the cylindrical portion, the butt-end defining an angular flare-out shoulder between its junction with the cable and the cylindrical portion and operable to seat with non-binding engagement within a tapered opening of the bushing proximate an entry/exit to the passage.

23. The device of claim 22, in which the locking end defines an elongated tab that extends axially from the cylindrical portion and defines an elongated slot of width sufficient to receive either a fold of the cable or a shaft of a padlock.

24. The device of claim 22, in which the power spring is assembled in the reel with a pre-bias sufficiently great to present a torque on the reel to forcibly seat the butt-end of the cable retention knob against a countersunk recess of the bushing that defines the taper when the cable is fully retrieved.

* * * * *